(12) United States Patent
Lamb

(10) Patent No.: US 11,276,081 B1
(45) Date of Patent: Mar. 15, 2022

(54) TARGETED COMMUNICATION USING ORDER FULFILLMENT LOGIC

(71) Applicant: International Business Machines Corporation, Armonk, NY (US)

(72) Inventor: Marshall Allen Lamb, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/325,345

(22) Filed: May 20, 2021

(51) Int. Cl.
  *G06Q 30/00* (2012.01)
  *G06Q 30/02* (2012.01)
  *G06Q 10/08* (2012.01)

(52) U.S. Cl.
  CPC ....... *G06Q 30/0261* (2013.01); *G06Q 10/087* (2013.01); *G06Q 30/0205* (2013.01); *G06Q 30/0269* (2013.01)

(58) Field of Classification Search
  CPC ............. G06Q 30/0261; G06Q 10/087; G06Q 30/0205; G06Q 30/0269
  See application file for complete search history.

(56) References Cited

U.S. PATENT DOCUMENTS

| | | | |
|---|---|---|---|
| 8,335,720 | B2 | 12/2012 | Juang et al. |
| 9,681,199 | B2 | 6/2017 | Jain et al. |
| 10,567,824 | B2 | 2/2020 | Fu et al. |
| 10,692,043 | B1* | 6/2020 | Woodyard ............. G06Q 50/28 |
| 10,922,646 | B1* | 2/2021 | Humair ................. G06N 20/00 |
| 10,956,865 | B1* | 3/2021 | Kim .................... G06Q 10/0875 |
| 2005/0222910 | A1 | 10/2005 | Wills |
| 2006/0259376 | A1* | 11/2006 | Ferreri ................. G06Q 10/087 705/28 |
| 2008/0004955 | A1 | 1/2008 | Mathew et al. |

(Continued)

OTHER PUBLICATIONS

Das, C., Supply and Redistribution Rules for Multilocation Inventory Systems, 1971, Bulletin of the Operations Research Society of America, (Year: 1971).*

(Continued)

*Primary Examiner* — Matthew L Hamilton
(74) *Attorney, Agent, or Firm* — Peter K. Suchecki

(57) ABSTRACT

Provided is a system, method, and computer program product for performing targeted advertising of a product. A processor may identify a consumer demography of potential consumers for an advertising campaign of a product. The processer may identify an inventory node map of the product. The processor may analyze the consumer demography and node map to identify a geographical collection of consumers for the advertising campaign according to an inventory availability relative to the consumer demography. The processor may determine relative expenses and a risk of inventory outages associated with order fulfillments of the product from the node map to form a fulfillment assessment map. The processor may update the geographical collection of consumers according to an optimizing profit and minimizing inventory outages criteria derived from adjusting the inventory availability and inventory location using the fulfillment assessment map. The processor may target advertising based on the updated geographical collection of consumers.

11 Claims, 8 Drawing Sheets

(56) References Cited

U.S. PATENT DOCUMENTS

| | | | |
|---|---|---|---|
| 2013/0339199 A1* | 12/2013 | Patt | G06Q 10/087 705/28 |
| 2014/0136316 A1 | 5/2014 | Spurr et al. | |
| 2016/0125456 A1 | 5/2016 | Wu et al. | |
| 2016/0358232 A1 | 12/2016 | Wang et al. | |
| 2017/0286899 A1* | 10/2017 | Deshpande | G06Q 10/087 |
| 2018/0218312 A1* | 8/2018 | Smith | G06Q 10/087 |
| 2018/0342007 A1 | 11/2018 | Brannigan et al. | |
| 2019/0258979 A1* | 8/2019 | Mulay | G06Q 10/06315 |
| 2019/0347606 A1* | 11/2019 | Malecha | G06Q 10/087 |
| 2020/0012983 A1* | 1/2020 | Wicker | G06Q 10/0875 |
| 2020/0272989 A1* | 8/2020 | Katsoulakos | G06Q 10/0835 |
| 2020/0320467 A1* | 10/2020 | Wu | G06Q 10/087 |
| 2020/0380452 A1* | 12/2020 | Vakhutinsky | G06Q 30/0205 |
| 2021/0142263 A1* | 5/2021 | Thakkar | G06Q 10/087 |
| 2021/0224736 A1* | 7/2021 | Abrahamson | G06Q 10/087 |

OTHER PUBLICATIONS

Anonymous, "SLADE: A Scalable Low-Cost System for Disseminating Targeted Advertisements in Developing Regions," https://priorart.ip.com/IPCOM/000244980, An IP.com Prior Art Database Technical Disclosure IPCOM000244980D; Feb. 4, 2016, 9 pgs.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

TARGETED COMMUNICATION USING ORDER FULFILLMENT LOGIC

BACKGROUND

The present disclosure relates generally to the field of computing and, more specifically, to performing targeted communication by combining data points from communication automation, inventory management, and fulfilment operations.

Many enterprises use numerous systems to make decisions backed by data. However, these systems may produce separate data points that are not often cross-linked or correlated with each other in a way that permits insights to be gleaned from all available data.

SUMMARY

Embodiments of the present disclosure include a method, system, and a computer program product for performing targeted advertising of a product. A processor may identify a consumer demography of potential consumers for an advertising campaign of a product. The processer may identify an inventory node map of the product. The processor may analyze the consumer demography and the inventory node map to identify a geographical collection of consumers for the advertising campaign according to an inventory availability relative to the consumer demography. The processor may determine relative expenses and a risk of inventory outages associated with order fulfillments of the product from the inventory node map to form a fulfillment assessment map. The processor may update the geographical collection of consumers according to an optimizing profit and minimizing inventory outages criteria derived from adjusting the inventory availability and inventory location using the fulfillment assessment map. The processor may target adverting based on the updated geographical collection of consumers.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
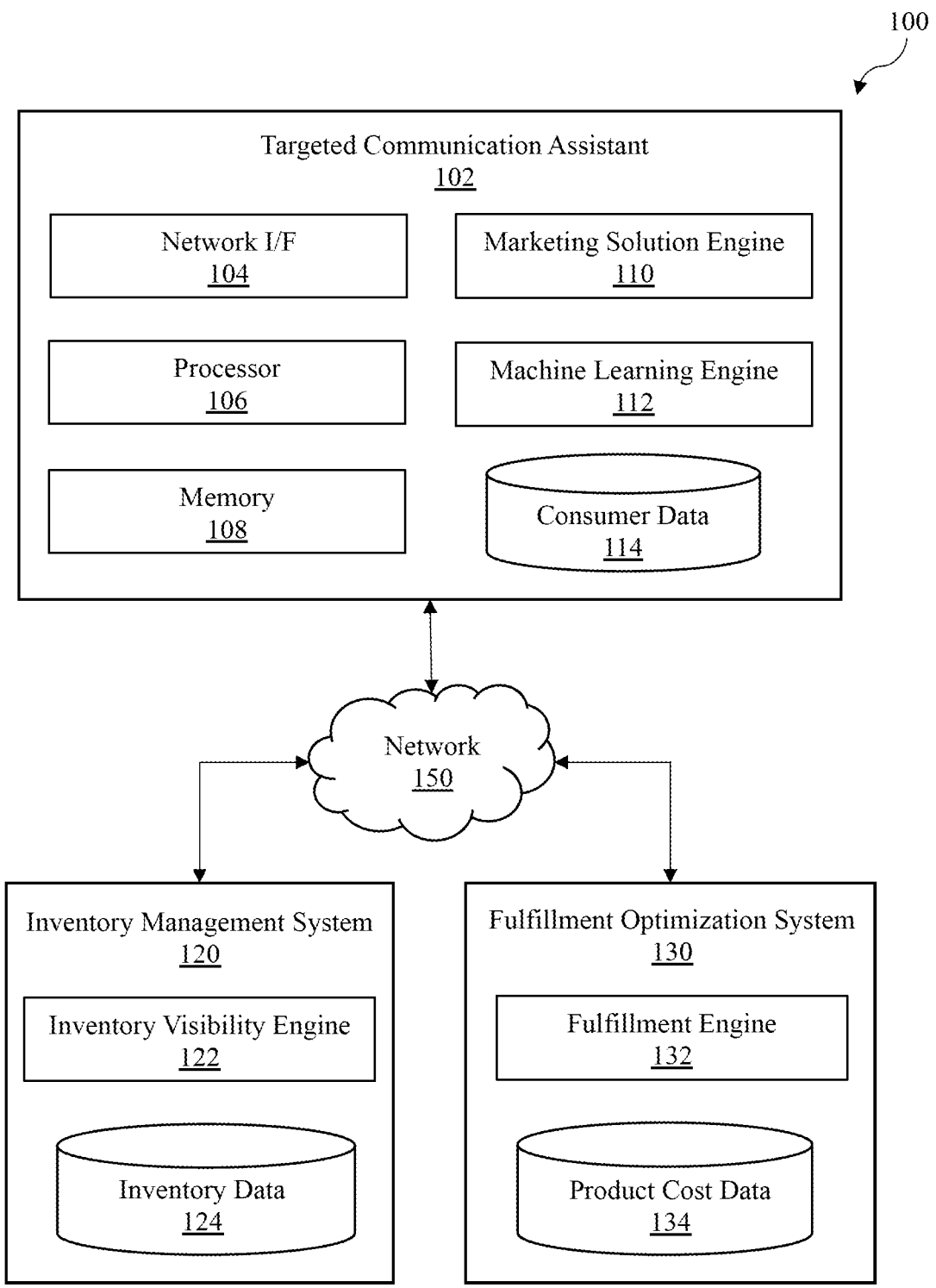
FIG. 1 illustrates a block diagram of an example targeted advertising system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of computing and, more particularly, to targeting communications to individuals by combining data points from messaging automation, inventory management, and fulfilment operations. While the present disclosure is not necessarily limited to such applications, various aspects of the disclosure may be appreciated through a discussion of various examples using this context.

Retail advertising campaigns often are used to assist with moving excess surplus inventory. Targeted advertising performed using electronic communications sent to potential consumers is also commonplace today. Many different algorithms can be applied to determine who to target with the advertising and what medium of communication to use (e.g., advertising on websites, radio, streaming media, television, etc.). One such common algorithm is to cross reference the target user's geographic location with collocated surplus inventory to make it not only easier, but cheaper, to sell that inventory to the nearby customer.

Retail buying trends, for many reasons, are shifting more to online sales, where such sales are most often fulfilled from distribution centers, and in increasing numbers, fulfilled from stores themselves. Therefore, when calculating where to target advertising based on surplus inventory, inventory on hand both at retail stores and distribution centers must be considered. However, it is not always wise to only geographically target advertising where the surplus inventory resides. If the local retail market has a healthy walk-in customer base, it typically is far cheaper to the business to deplete inventory through in-store sales than to ship product inventory to an online customer.

Additionally, the cost to distribute retail goods can vary widely by geographic region based on factors such as shipping costs (e.g., trucking costs, driver costs, vehicle maintenance, vehicle availability, etc.). So while some regions may have surplus inventory of a given product maintained in the company's distribution centers, it may be more economical to transfer that inventory to lower cost distribution centers and fulfill orders from that center. In turn, this changes the geographic shape of the targeted advertising campaign.

Embodiments of the present disclosure include a targeted communication (e.g., advertisement or marketing) system, method, and computer program product for performing targeted advertising of a product. The present disclosure leverages existing data from one or more systems to accurately predict a likelihood of where targeted communications will achieve a highest success of reaching a potential consumer of a product.

In embodiments, the targeted communication system may identify a consumer demography of potential consumers for an advertising campaign of a product. For example, a user or administrator may input a set of consumer attributes that relate to a specific type of consumer to which a given product may be marketed to by the system. The set of consumer attributes may comprise various criteria, such as buying habits, consumer demographics, consumer locations, consumer online patterns, product purchasing history, etc.

In some embodiments, the targeted communication system may use a marketing or advertising automation algorithm to automatically determine the consumer demography. For example, the targeted advertising system may be configured to pull the attributes from previous sales of the product to determine what the best consumer demography of potential consumers is as a starting point for building the targeted advertising campaign.

In embodiments, the targeted communication system may identify an inventory node map for the product. The inventory node map comprises various inventory levels at various locations of a given region. For example, the locations may include both retail stores and distribution centers for a product plotted on a visible inventory map of a region (e.g., country, state, city, etc.). In some embodiments, the inventory node map may be received and/or generated from data collected from an inventory management system. In some embodiments, the inventory management system may be configured as an IBM Sterling® Inventory Visibility system (IBM Sterling® Inventory Visibility and all IBM Sterling® based trademarks and logos are trademarks or registered trademarks of International Business Machines Corporation and/or its affiliates). In some embodiments, the targeted communication system may be integrated with the inventory management system.

In embodiments, the targeted communication system is configured to analyze both the consumer demography and the inventory node map to identify a geographical collection of consumers (or target consumers) for the advertising campaign. This may be performed by comparing an inventory availability at various locations on the inventory node map relative to the consumer demography in proximity to those locations. The geographical collection of consumers may be a default representation of the consumers that make the most sense to target the product using the advertising campaign. However, this default representation fails to take into account an optimized profit margin, as some regions may be more expensive to serve consumers than others, or in some instances could cause stock outage situations if advertising in the region depletes safety stock on hand at one or more inventory locations.

In embodiments, the targeted communication system determines relative expenses and a risk of inventory outages associated with order fulfillments of the product from the inventory node map to form a fulfillment assessment map. In embodiments, the relative expenses and the risk of inventory outages associated with order fulfillments of the product are determined from cost data (e.g., expenses or costs relative to shipping, selling, maintaining, and/or fulfillment of the product) that is received from a fulfillment optimization system. In some embodiments, the fulfillment optimization system may be an IBM Sterling® Fulfillment Optimizer with Watson® system (IBM Sterling® Fulfillment Optimizer and all IBM Watson® based trademarks and logos are trademarks or registered trademarks of International Business Machines Corporation and/or its affiliates). In some embodiments, the targeting communication system, the fulfillment optimization system, and/or the inventory management system may be configured as one integrated system. In some embodiments, the systems may be separately maintained.

In embodiments, the fulfillment assessment map is used to determine the relative expense of product/order fulfillment from retail stores and distribution centers across the inventory node map. The targeted communication system analyzes the expenses related to order fulfillment in conjunction with the inventory node to make determinations on where inventory stock levels are appropriate and where they can be transferred based on costs. Using the fulfilment assessment map, the targeted communication system can determine an optimizing profit and a minimizing inventory outage criteria derived from adjusting the inventory availability and inventory location. In this way, the targeted communication system can determine if, for example, a company/product maker can increase profits or alternatively decrease expenses by fulfilling orders from one or more different inventory locations by adjusting the inventory stock, while also preventing any unforeseen inventory outages due to inventory reallocation.

In some embodiments, the targeted communication system may utilize one or more optimizing profit and minimizing inventory outage thresholds used to determine if inventory should be reallocated. For example, the system may not transfer inventory if the profit or expense savings is insignificant. Alternatively, if there is a chance that the inventory may cause a shortage at another location (even if resulting in a net profit), the system may not reallocate the inventory if certain thresholds are not met. In some embodiments, the thresholds may be determined by machine learning. For example, the targeted advertising system may use machine learning to continuously analyze various historical data related to relative costs of product fulfillment and inventory availability and automatically generate thresholds from the data. These thresholds may be continuously updated to provide improved predictions and accuracy for allocating inventory.

In embodiments, the targeted communication system may update the geographical collection of consumers based on the adjustment or reallocation of inventory. For example, if inventory is reallocated from a first inventory location that has a surplus of product to a second inventory location that has a depleted product inventory, the targeted consumers at the second location may be increased as a result of the increased inventory, while the first inventory location's targeted consumers may be reduced or remain the same if inventory availability is maintained at a sufficient level. In embodiments, the targeted communication system may then target advertising of the product by sending various communication related to the product to given consumers based on the updated geographical collection of consumers.

In this way, the targeted communication system can target pre-sales advertising activity rather than order placement activity only. This allows the system to perform targeted advertising of products on a much broader collection of users. The targeted communication system applies order fulfillment cost logic to determine the optimal advertising context in order to attract the most likely buyers of the product. Further, fulfillment costs are factored into whether or not geographically, any co-located inventory should be factored into the advertising context. For example, costs for distributing the product that is being advertised are determined and used to adjust where both the inventory for fulfillment comes from and for where the targeted advertising campaign is implemented. This, in turn, will allow a company to improve how advertising is implemented while further cutting costs related to product fulfillment.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of an example targeted advertising system 100, in accordance with embodiments of the present disclosure. In the illustrated embodiment, targeted advertising system 100 includes targeted advertising assistant 102 that is communicatively coupled to inventory management system 120 and fulfillment optimization system 130 via network 150. Targeted communication assistant 102, inventory management system 120, and fulfillment optimization system 130 may be configured as any type of computer system and may be substantially similar to computer system 1101 of FIG. 4. In some embodiments, targeted advertising assistant 102, inventory management system 120, and fulfillment optimization system 130 may be configured as separate standalone systems or as one integrated system.

Network 150 may be any type of communication network, such as a wireless network or a cloud computing network. Network 150 may be substantially similar to, or the same as, cloud computing environment 50 described in FIG. 5. In some embodiments, network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over network 150.

In some embodiments, network 150 can be implemented using any number of any suitable communications media. For example, the network may be a wide area network (WAN), a local area network (LAN), a personal area network (PAN), an internet, or an intranet. In certain embodiments, the various systems may be local to each other, and communicate via any appropriate local communication medium. For example, targeted advertising assistant 102 may communicate with inventory management system 120 and fulfillment optimization system 130 using a WAN, one or more hardwire connections (e.g., an Ethernet cable), and/or wireless communication networks. In some embodiments, the various systems may be communicatively coupled using a combination of one or more networks and/or one or more local connections. For example, in some embodiments targeted advertising assistant 102 may communicate with fulfillment optimization system 130 using a hardwired connection, while communication between inventory management system 120 and targeted advertising assistant 102 may be through a wireless communication network.

In embodiments, inventory management system 120 may be any type of inventory management system that is configured to monitor, adjust, update, display, and/or manage inventory of one or more products. In some embodiments, inventory management system 120 may be an IBM Sterling® Inventory Visibility system (IBM Sterling® Inventory Visibility and all IBM Sterling® based trademarks and logos are trademarks or registered trademarks of International Business Machines Corporation and/or its affiliates). In embodiments, inventory management system 120 includes inventory visibility engine 122 and inventory data 124. In some embodiments, inventory management system 120 may include some or similar components (e.g., processor, memory, machine learning engine, etc.) as targeted advertising assistant 102 but for brevity purposes these components are not shown. Inventory visibility engine 122 may be configured to process inventory supply and demand activity to provide an accurate and real-time global/geographic visibility information across various selling channels. In embodiments, inventory visibility engine 122 may be configured to generate one or more inventory node maps indicating accurate and real-time inventories at one or more locations. Locations may include various retail stores, warehouses, and/or distribution centers associated with a product. By providing real-time inventory information, the inventory visibility engine 122 may reduce latency in inventory updates and reduce out-of-stock, oversell, and markdown of the product.

In embodiments, fulfillment optimization system 130 may be any type of product fulfillment system that is configured to determine relative expenses and/or costs of order fulfillment associated with selling a product from one or more locations (e.g., retail stores, warehouses, distribution centers, etc.). In some embodiments, fulfillment optimization system 130 may be an IBM Sterling® Fulfillment Optimizer with Watson® system (IBM Sterling® Fulfillment Optimizer and all IBM Watson® based trademarks and logos are trademarks or registered trademarks of International Business Machines Corporation and/or its affiliates). In the illustrated embodiment, fulfillment optimization system 130 includes fulfillment engine 132 and product cost data 124. In some embodiments, fulfillment optimization system 130 may include some or similar components (e.g., processor, memory, machine learning engine, etc.) as targeted advertising assistant 102 but for brevity purposes these components are not shown. Fulfilment engine 132 may be configured to process and/or determine relative costs associated with order fulfilment of one or more products by analyzing product costs data 124. In embodiments, fulfillment engine 132 may be configured to determine shipping costs of fulfilling orders of products at each inventory location node and determine a least costly shipping location related to one or more targeted consumers as determined by the targeting advertising assistant 102.

In the illustrated embodiment, targeted communication assistant 102 includes network interface (I/F) 104, processor 106, memory 108, marketing solution engine 110, machine learning engine 112, and consumer data 114.

In embodiments, marketing solution engine 110 is configured to determine, identify, and/or generate a consumer demography of potential consumers for an advertising campaign of a product. Marketing solution engine 110 may identify the consumer demography of potential consumers by analyzing consumer data 114. In embodiments, marketing solution engine 110 may be configured to analyze both the consumer demography and the inventory node map received from the inventory management system 120 to identify a geographical collection of consumers for the advertising campaign (or target consumers). Marketing solution engine 110 may generate a fulfillment assessment map by using the inventory node map and relative expenses related to product fulfillment received from fulfillment optimization system 130. Marketing solution engine 110 can determine an optimizing profit and a minimizing inventory outage criteria derived from adjusting the inventory availability and inventory location(s). Once determined, marketing solution engine 110 in conjunction with inventory management system 120 may reallocate product inventory using the fulfilment assessment map. Marketing solution engine 110 may update the geographical collection of consumers based on the adjustment or reallocation of inventory and then perform targeted advertising of the product based on the reallocation of inventory.

In embodiments, machine learning engine 112 may collect, monitor, and/or analyze various data (consumer data 114, inventory data 124, product cost data 134) related to the targeted advertising system 100 to determine various inventory, costs, and/or advertising patterns related to advertising a given product. Using the determined patterns, machine learning engine 112 may automatically implement and/or adjust various thresholds (optimizing profit thresholds, inventory thresholds, targeted advertising threshold, etc.) used to determine if inventory should be reallocated and where the system should perform targeted advertising. For example, the system may implement target consumer minimum thresholds (e.g., indicating that more than a minimum number of consumers are available in that location) that must be met before targeted advertising campaigns are reallocated. In embodiments, machine learning engine 112 can utilize machine learning and/or deep learning, where algorithms or models can be generated by performing supervised, unsupervised, or semi-supervised training on historical data related to the product (e.g., inventory allocation, advertising costs, advertising success) and correlate historical success rates when implementing targeted advertising for a specific consumer group. Over time, machine learning engine 112 may improve predictions for how to target advertising for a specific product to a specific collection of consumers.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

FIG. 1 is intended to depict the representative major components of targeted advertising system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with targeted advertising system 100 may not be present, and the arrangement of components may vary.

For example, while FIG. 1 illustrates an example targeted advertising system 100 having a single targeted communication assistant 102, a single inventory management system 120, and a single fulfillment optimization system 130 that are communicatively coupled via a single network 150, suitable network architectures for implementing embodiments of this disclosure may include any number of targeted advertising assistants, inventory management systems, fulfillment optimization systems, and networks. The various models, modules, systems, and components illustrated in FIG. 1 may exist, if at all, across a plurality of targeted communication assistants, inventory management systems, fulfillment optimization systems, and networks.

Figure 2:
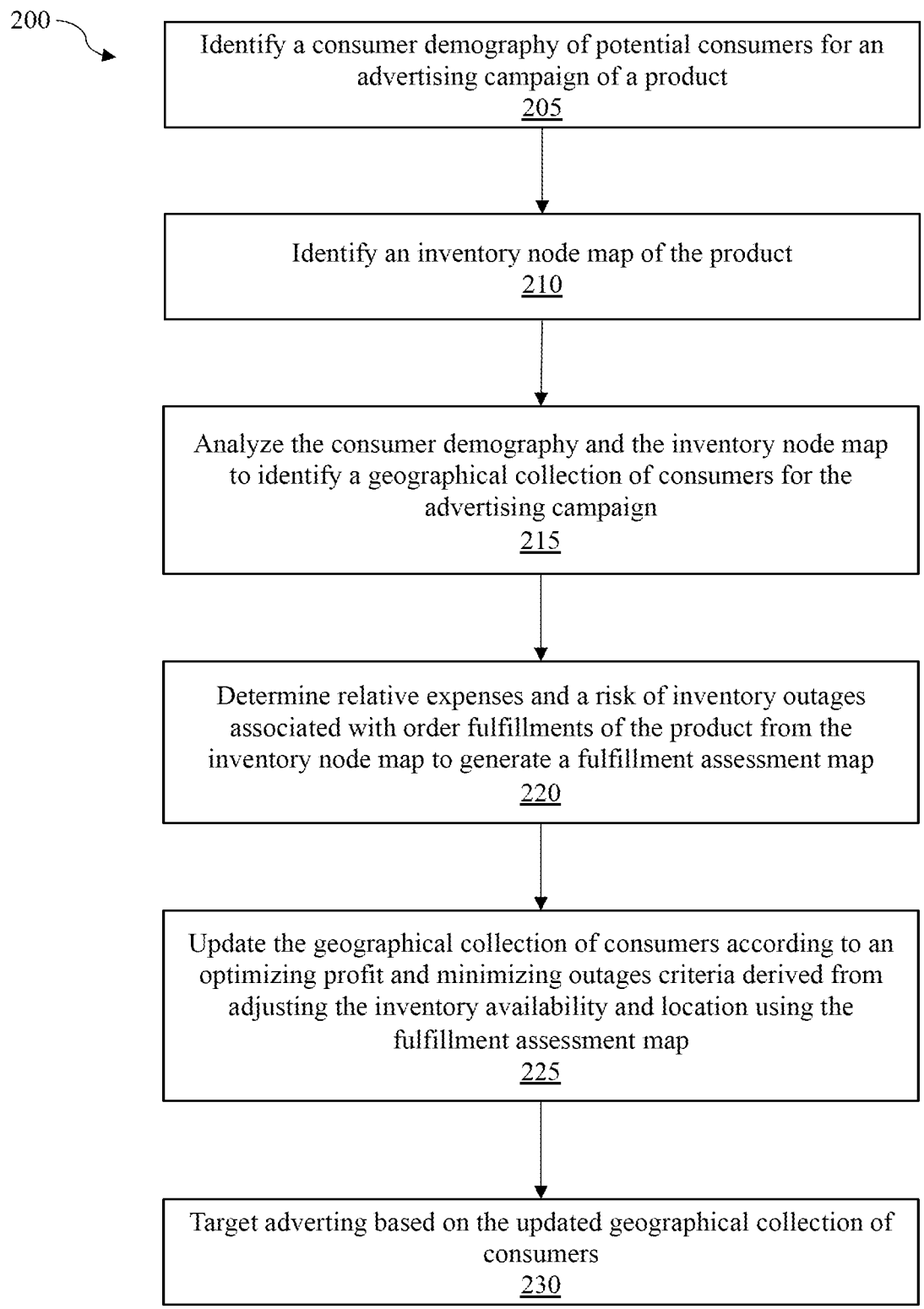
FIG. 2 illustrates a flow diagram of an example process for performing targeted advertising of a product, in accordance with embodiments of the present disclosure.

Referring now to FIG. 2, shown is a flow diagram of an example process 200 for performing targeted advertising of a product, in accordance with embodiments of the present disclosure. The process 200 may be performed by processing logic that comprises hardware (e.g., circuitry, dedicated logic, programmable logic, microcode, etc.), software (e.g., instructions run on a processor), firmware, or a combination thereof. In some embodiments, the process 200 is a computer-implemented process. In embodiments, the process 200 may be performed by processor 106 of targeted advertising assistant 102 exemplified in FIG. 1.

The process 200 begins by identifying a consumer demography of potential consumers for an advertising campaign of a product. This is illustrated at step 205. In embodiments, the consumer demography may be determined using a marketing/advertising automation solution (e.g., marketing solution engine 110). For example, targeted advertising system 100 may automatically determine the appropriate customer demographic for the advertising campaign for a given product as a starting point. This may include analyzing various consumer demography attributes. For example, consumer demography attributes may include consumer buying habits, age ranges, user activities relative to the product, user location relative to the product, etc. In embodiments, the attributes may be provided a score that is used to determine a likelihood that a given consumer would buy a product. For example, the product may be a kayak, where the system may analyze consumer demography attributes such as the potential consumer's proximity to lakes, rivers, and/or coastal regions and the age range of customers that have bought kayaks in the past and provide these attributes with a score. Using the score, the system may determine the consumer demography of potential consumers having the highest score (e.g., based on a range, minimum threshold, etc.) as a starting point for building an initial advertising campaign.

Figure 3A:
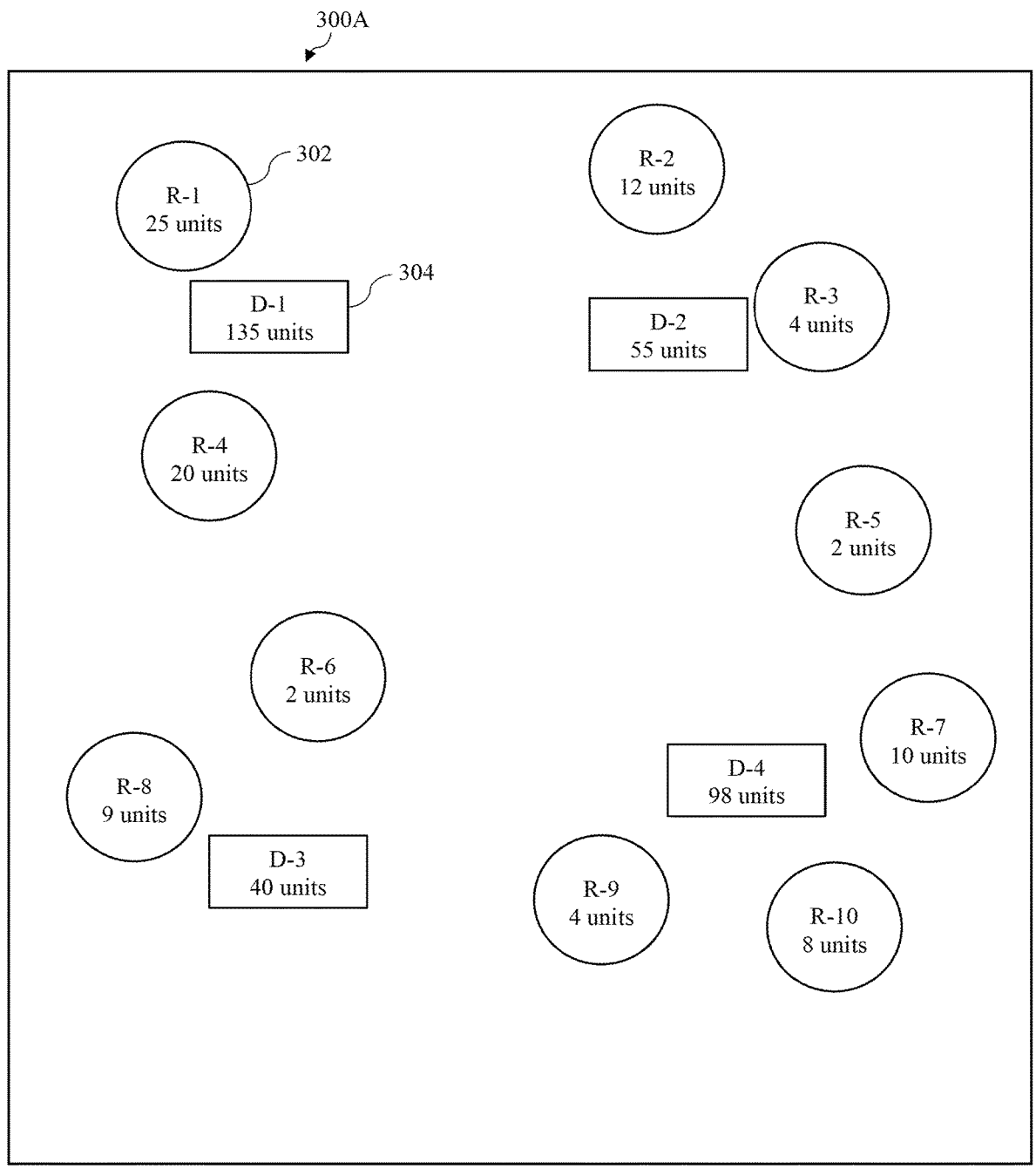
FIG. 3A illustrates an example inventory node map, in accordance with embodiments of the present disclosure.

The process 200 continues by identifying an inventory node map of the product. This is illustrated at step 210. In embodiments, the system 100 may utilize an inventory management system (e.g., inventory management system 120) to generate the inventory node map of the product. An example representation of the inventory node map is illustrated in FIG. 3A, which will be discussed below in conjunction with process 200. In embodiments, the inventory node map comprises various locations and current inventories of the product at one or more retail stores, distribution centers, and/or warehouses.

Referring now to FIG. 3A, shown is an example inventory node map 300 that includes retail stores 302 indicated by an "R" designation and distributions centers 304 indicated by a "D" designation. Each retail store 302 and distribution center 304 includes a number of units of a specific product that a given location has on hand in its inventory. Returning to the example above, the product will be discussed as being a kayak, however, this is not meant to be limiting as the product can be any type of product (e.g., car, equipment, food, etc.). A company marketing the kayak may have a surplus inventory of kayaks and want to build an online advertising campaign targeting sale of its inventory where the largest number of sales at the highest profit margin are possible. Here, the inventory or units of kayaks available at each location (e.g., retail store 302 and distribution center 304) is visibly shown on the inventory node map 300. In embodiments, the inventory node map continuously maintains the current inventory levels at each of the product locations in relation to current and/or pending sales.

Referring back to FIG. 2, the process 200 continues by analyzing the consumer demography and the inventory node map to identify a geographical collection of consumers for the advertising campaign according to an inventory availability relative to the consumer demography. This is illustrated at step 215. In embodiments, the targeted advertising system uses the data points from the initially identified consumer demography of step 205 and the inventory node map of step 210 to identify one or more geographical collections (or target regions) of consumers in relation to their proximity to the inventory locations. An example representation of the geographical collection of consumers is illustrated in FIG. 3B which will be discussed further below in conjunction with process 200.

Figure 3B:
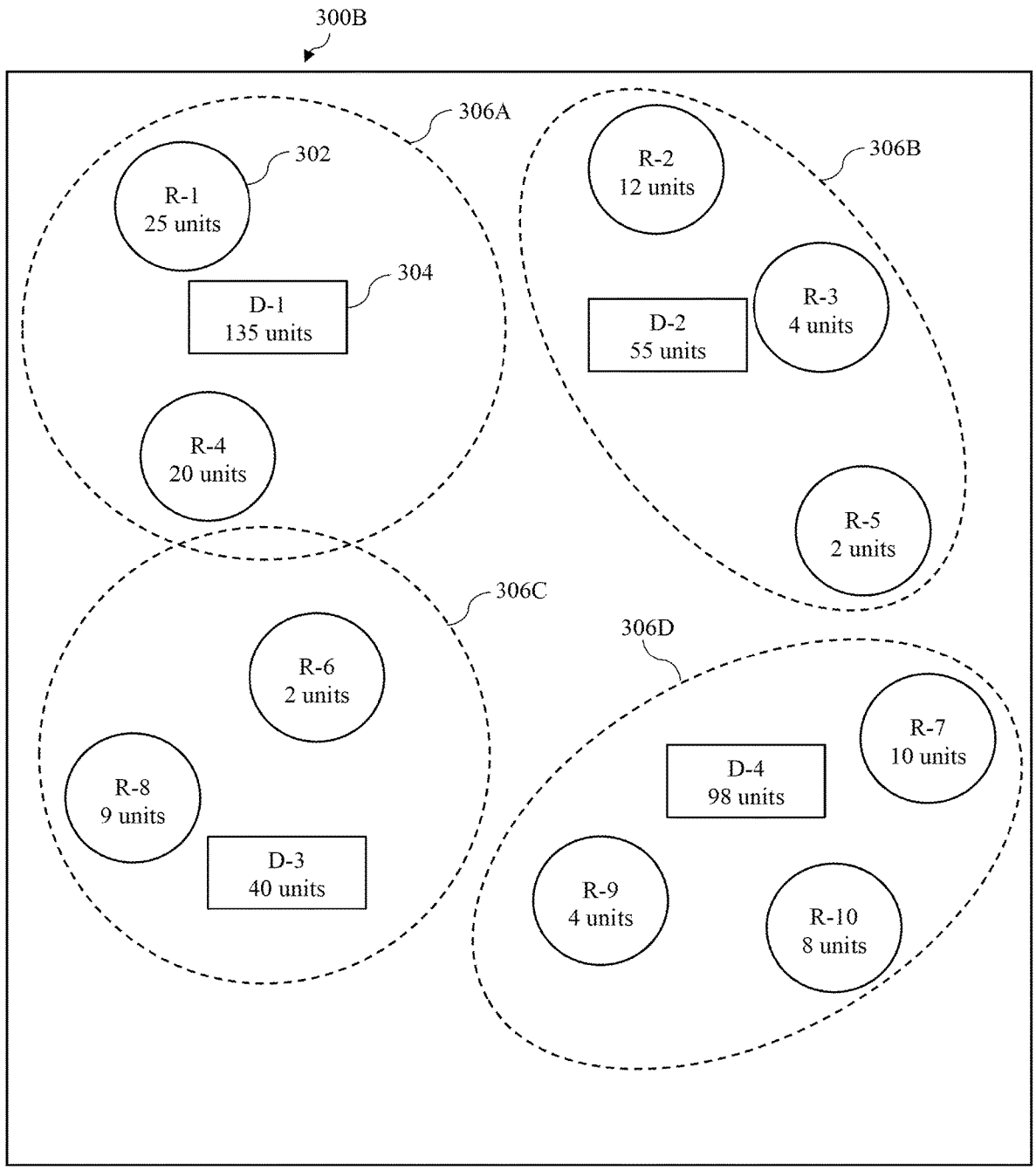
FIG. 3B illustrates an example representation of geographical collections of consumers relative to inventory availability, in accordance with embodiments of the present disclosure.

Referring now to FIG. 3B, shown are geographical collections of consumers 306A, 306B, 306C, and 306D, collectively referred to as geographical collection of consumers 306, plotted on the inventory node map 300B. The geographic collection of consumers 306 are indicated by dashed circles or ellipses that denote a default representation of potential consumers that are the most likely consumers to target the advertising campaign to for selling the product. However, this default representation fails to take into account an optimized profit margin, as some regions may be more expensive to serve consumers than others, or in some instances, could cause stock outage situations if advertising in the region deplete safety stock inventory on hand at one or more locations.

Returning back to FIG. 2, the process 200 continues by determining relative expenses and a risk of inventory outages associated with order fulfillments of the product from the inventory node map to form a fulfillment assessment map. This is illustrated at step 220. In embodiments, the targeted advertising system may receive fulfillment data from a fulfillment optimization system (e.g., fulfillment optimization system 130) to determine the relative expenses related with fulfilling product orders and data related to the risk of inventory outages. Using this data, the targeted advertising system can form the fulfillment assessment map to determine where various inventory levels are too high and reallocate those inventory levels by taking into account expenses and any safety stock or inventory shortages.

In embodiments, the process 200 continues by updating the geographical collection of consumers according to an optimizing profit and minimizing outages criteria derived from adjusting the inventory availability and location using the fulfillment assessment map. This is illustrated at step 225. An example representation of an updated geographical collection of consumers is illustrated in FIG. 3C which will be discussed further in conjunction with process 200.

Figure 3C:
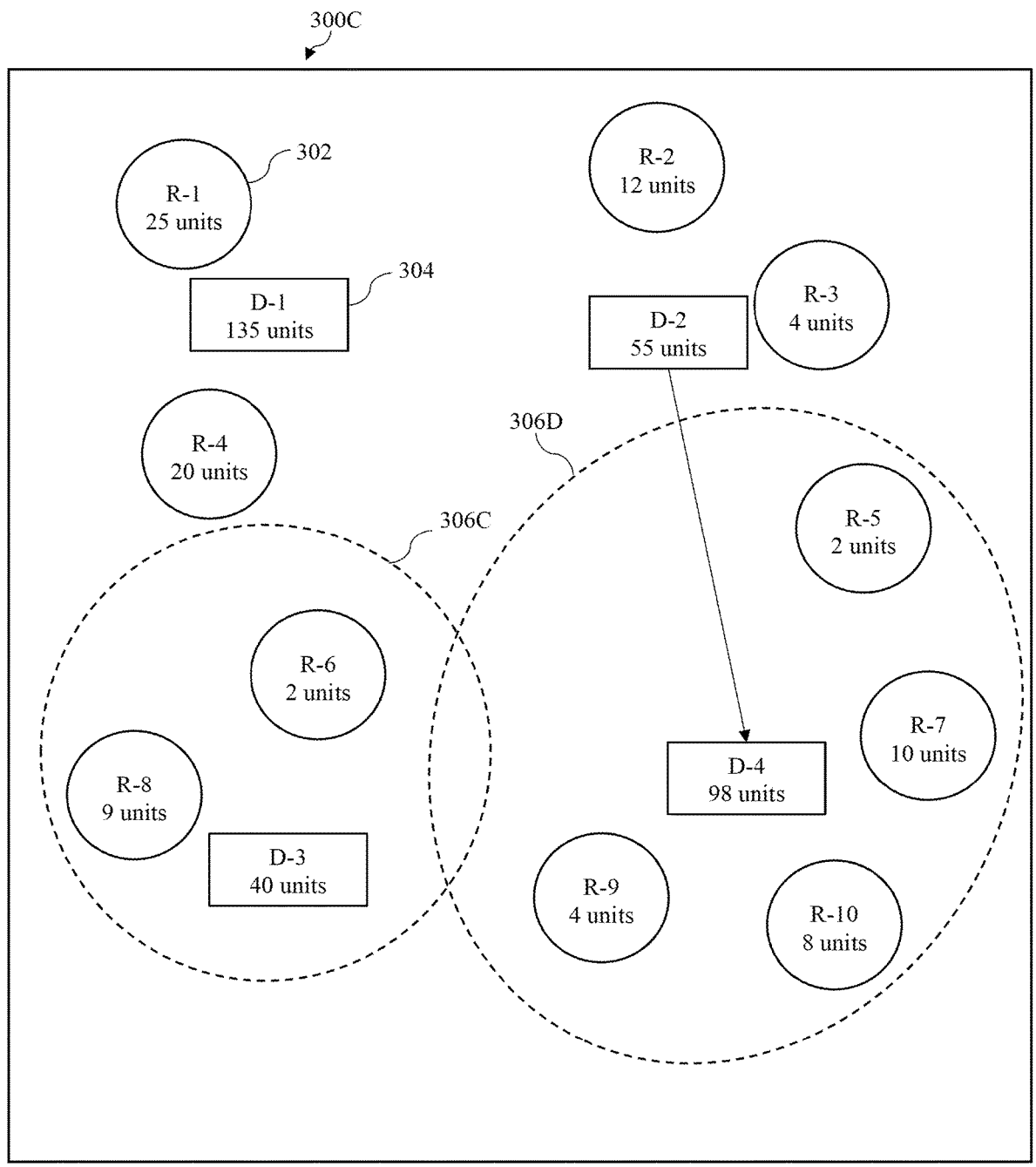
FIG. 3C illustrates an updated geographical collection of consumers based on fulfillment assessment mapping, in accordance with embodiments of the present disclosure.

Referring now to FIG. 3C, shown is the updated geographical collections of consumers 306C and 306D based on a fulfillment assessment map 300C. In the illustrated embodiment, the targeted advertising system may analyze various profit and minimizing inventory outage criteria to make determinations on where to allocate targeted advertising resources. In some embodiments, the targeted advertising system may compare the risk of inventory outages associated with order fulfillment of the product for a first inventory location to an inventory safety stock maximum threshold and remove, in response to the inventory safety stock maximum threshold being met, a first inventory location from the advertising campaign.

For example, using the fulfillment assessment map, the targeted advertising system may determine that retail stores 302 R-1 and R-2 have very high safety stock levels of the product to risk too many online sales in that region. Returning to the kayak example, these stores may be in a region, such as the Pacific Northwest of the United States, that has a lot of walk-in customers due to the proximity to rivers, oceans, and lakes. Therefore, the targeted advertising system may remove retail stores 302 R-1 and R-2 in addition to distribution center 303 D-1 that serves this region from the targeted advertising campaign since walk-in consumers are favored over online consumers because of costs related to shipping directly to customers.

Further, the targeted advertising system may determine, based on fulfillment costs/profits, that the cost to ship items from distribution center 304 D-2 is too high for fulfilling online orders, so that region may be removed from the targeted advertising campaign as well.

Thus, the geographical collections of consumers 306A and 306B shown in FIG. 3B have been removed from the geographical collection of consumers 306 related to the targeted advertising campaign illustrated in FIG. 3C.

In some embodiments, the targeted advertising system may transfer, in response to optimizing profit and minimizing inventory outage thresholds being met, a first inventory of the product at a first inventory location to a second inventory of the product at a second inventory location and update the geographical collection of consumers related to the second inventory location, where the updated geographical collection of consumers is increased based on the transferring of the first inventory to the second inventory location.

For example, using the fulfillment assessment map 300C, the targeted advertising system may determine that the cost of distribution is lowest from distribution center 304 D-4, and since bulk distribution between distribution centers is lowest, any excess surplus can be transferred from distribution center 304 D-2 to distribution center 304 D-4 and the region served by distribution center 304 D-4 can increase its geographical collection of consumers 306D to accommodate the increase in allocation of product inventory. Thus, distribution center 304 D-4 will provide fulfillment of product coverage for retail store 302 R-5 which was originally allocated to distribution center 304 D-2.

Returning to FIG. 2, the process 200 continues by targeting advertising based on the updated geographical collection of consumers. This is illustrated at step 230. For example, the targeted advertising system will utilize available inventory data (e.g., inventory placement, levels, stocks, reallocation, etc.) and fulfillment data to determine a final geographical collection of consumers to target with one or more communications associated with an advertising campaign. This allows the system to create a targeted advertising campaign that maximizes both sales of surplus inventor and profit margin on those sales.

Figure 4:
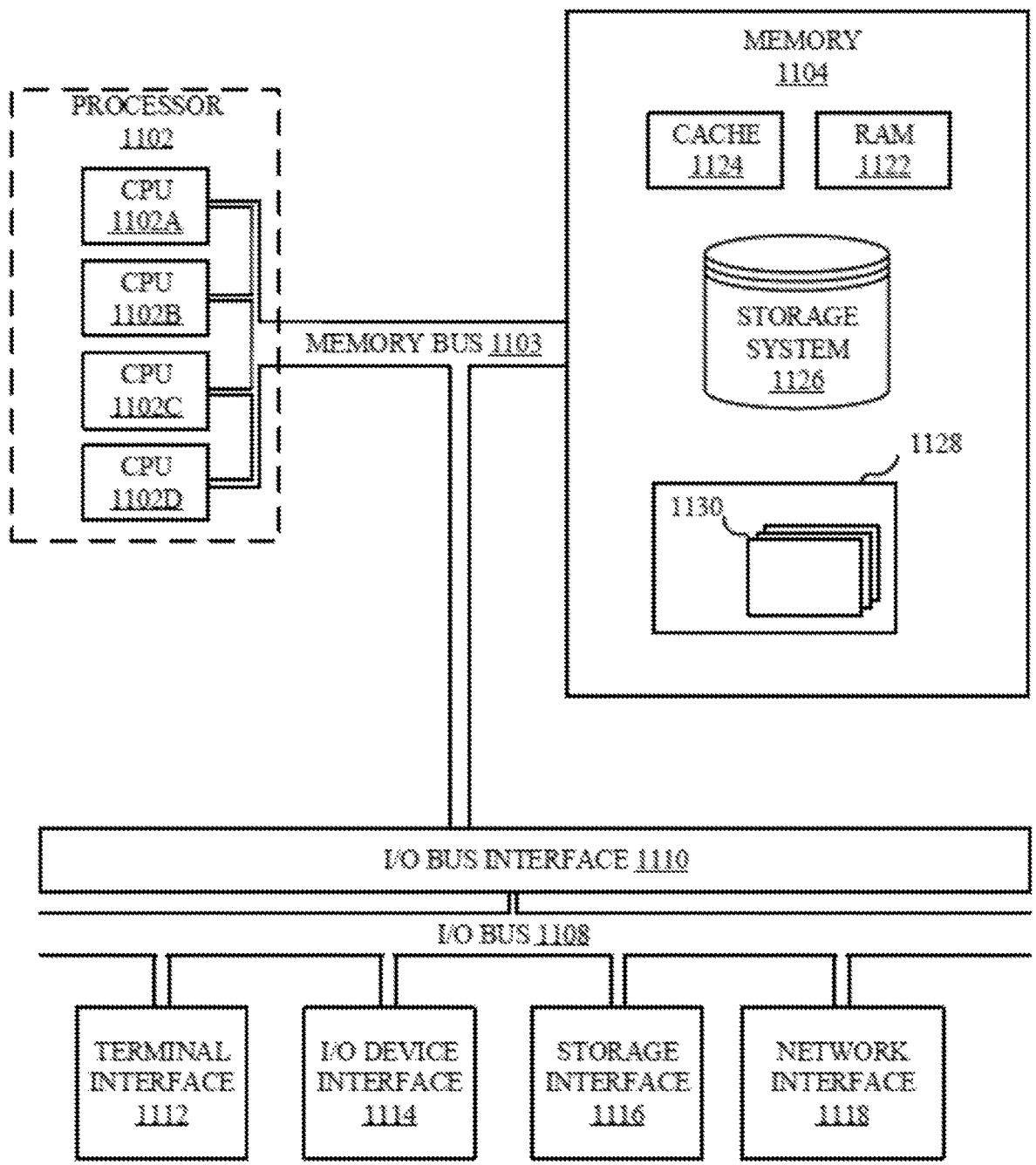
FIG. 4 illustrates a high-level block diagram of an example computer system that may be used in implementing one or more of the methods, tools, and modules, and any related functions, described herein, in accordance with embodiments of the present disclosure.

Referring now to FIG. 4, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200 as described in FIG. 2). In some embodiments, the computer system 1101 may be configured as targeted advertising system 100 of FIG. 1.

System memory subsystem 1104 may include computer system readable media in the form of volatile memory, such as random-access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 4 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 1101. In some embodiments, however, individual components may have greater or lesser complexity than as represented in FIG. 4, components other than or in addition to those shown in FIG. 4 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various targeted advertising assistants through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
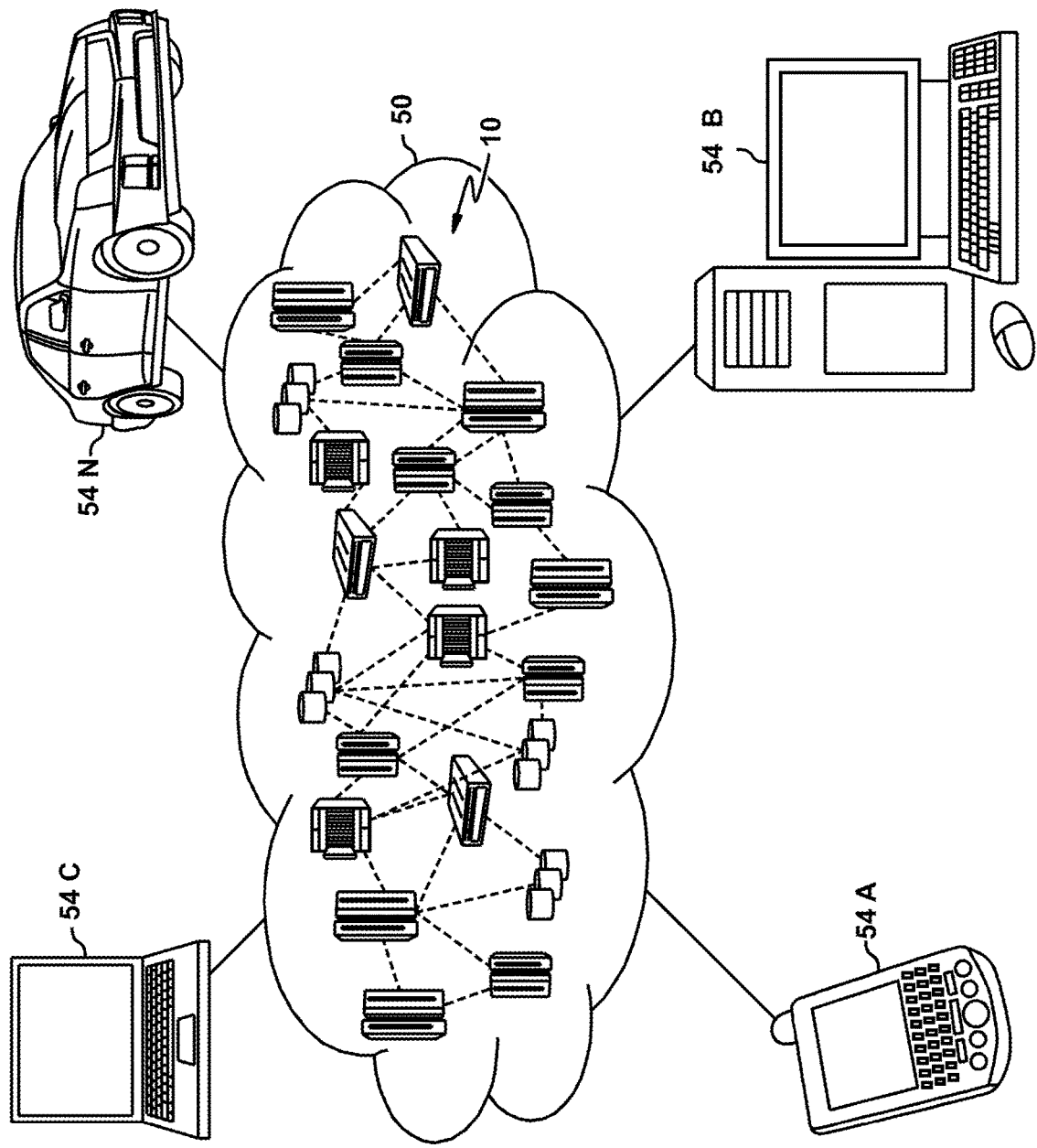
FIG. 5 depicts a cloud computing environment in accordance with embodiments of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
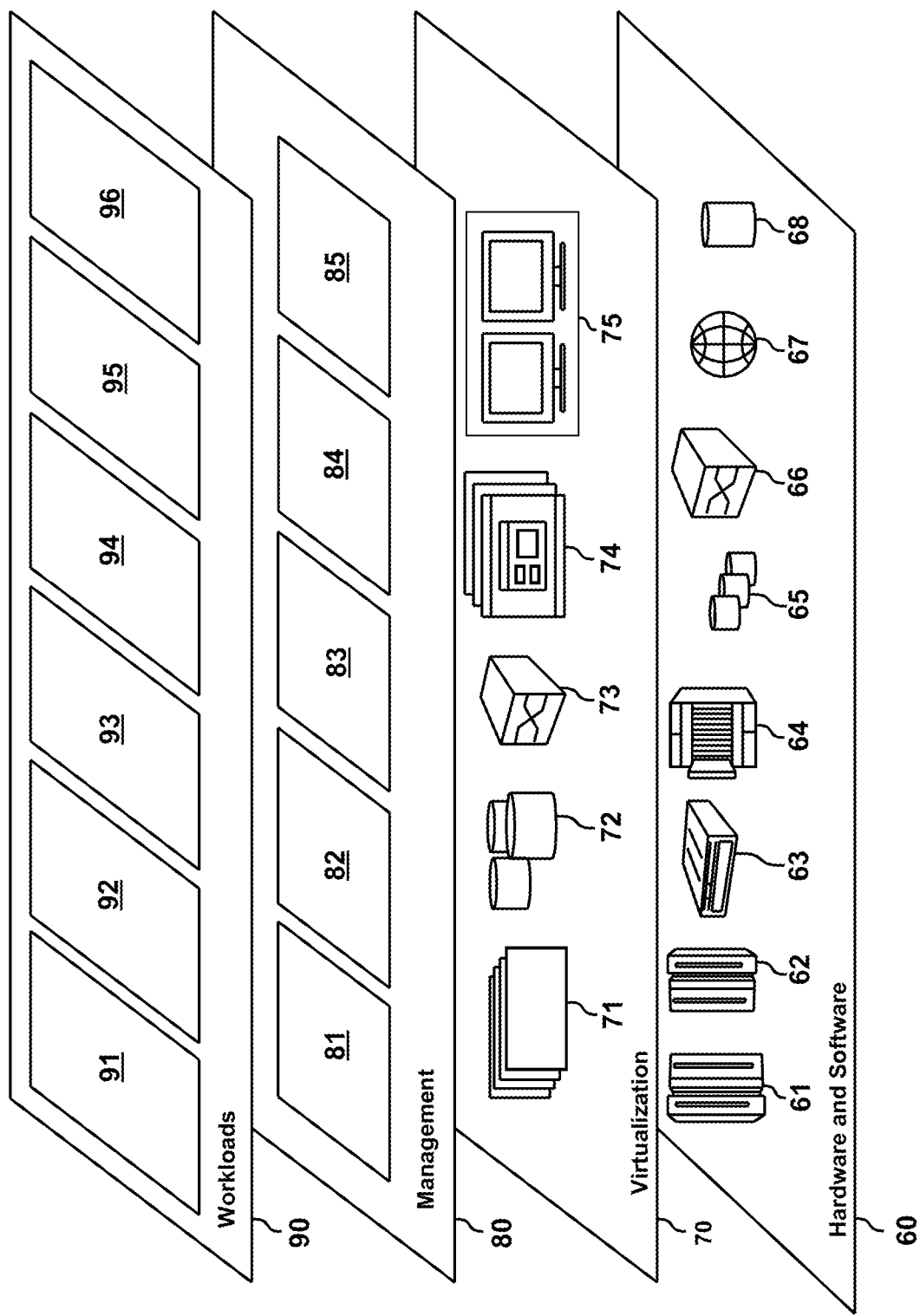
FIG. 6 depicts abstraction model layers in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and search engine software 68 in relation to the targeted advertising system 100 of FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and search query processing 96. For example, targeted advertising system 100 of FIG. 1 may be configured to perform targeted advertising of a product using workloads layer 90.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A system comprising:
a processor; and
a computer-readable storage medium communicatively coupled to the processor and storing program instructions which, when executed by the processor, cause the processor to perform a method comprising:
identifying a consumer demography of potential consumers for an advertising campaign of a product;
receiving, through a network, inventory data associated with the product from an inventory management system;
in response to receiving the inventory data, generating an inventory node map of the product, wherein the inventory node map comprises inventory levels of one or more retail stores and one or more distribution centers of a geographic location;
analyzing the consumer demography and the inventory node map;
in response to the analyzing, identifying a geographical collection of consumers for the advertising campaign according to an inventory availability relative to the consumer demography;

receiving, through the network, fulfillment data associated with the product from a fulfillment optimization system;
in response to receiving the fulfillment data, determining relative expenses and a risk of inventory outages associated with order fulfillments of the product from the inventory node map;
generating, based on the determining, a fulfillment assessment map;
updating the geographical collection of consumers according to an optimizing profit and minimizing inventory outages criteria derived from adjusting the inventory availability and inventory location using the fulfillment assessment map; and
rebalancing adverting based on the updated geographical collection of consumers.

2. The system of claim 1, wherein the updating the geographical collection of consumers according to the optimizing profit and minimizing inventory outages criteria derived from adjusting the inventory availability and the inventory location using the fulfillment assessment map, comprises:
transferring, in response to optimizing profit and minimizing inventory outage thresholds being met, a first inventory of the product at a first inventory location to a second inventory of the product at a second inventory location; and
updating the geographical collection of consumers related to the second inventory location, wherein the updated geographical collection of consumers is increased based on the transferring of the first inventory to the second inventory location.

3. The system of claim 1, wherein the updating the geographical collection of consumers according to the optimizing profit and minimizing inventory outages criteria derived from adjusting the inventory availability and the inventory location using the fulfillment assessment map, comprises:
comparing the risk of inventory outages associated with order fulfillments of the product for a first inventory location to an inventory safety stock maximum threshold; and
removing, in response to the inventory safety stock maximum threshold being met, a first inventory location from the advertising campaign.

4. The system of claim 1, wherein the optimizing profit and minimizing inventory outages criteria are determined by analyzing historical cost data and inventory outage data using machine learning.

5. A method comprising:
identifying, by a processor, a consumer demography of potential consumers for an advertising campaign of a product;
receiving, by the processor and through a network, inventory data associated with the product from an inventory management system;
in response to receiving the inventory data, generating, by the processor, an inventory node map of the product, wherein the inventory node map comprises inventory levels of one or more retail stores and one or more distribution centers of a geographic location;
analyzing, by the processor, the consumer demography and the inventory node map;
in response to the analyzing, identifying, by the processor, a geographical collection of consumers for the advertising campaign according to an inventory availability relative to the consumer demography;
receiving, by the processor and through the network, fulfillment data associated with the product from a fulfillment optimization system;
in response to receiving the fulfillment data, determining, by the processor, relative expenses and a risk of inventory outages associated with order fulfillments of the product from the inventory node map;
generating, by the processor and based on the determining, a fulfillment assessment map;
updating, by the processor, the geographical collection of consumers according to an optimizing profit and minimizing inventory outages criteria derived from adjusting the inventory availability and inventory location using the fulfillment assessment map; and
rebalancing, by the processor, adverting based on the updated geographical collection of consumers.

6. The method of claim 5, wherein the updating the geographical collection of consumers according to the optimizing profit and minimizing inventory outages criteria derived from adjusting the inventory availability and the inventory location using the fulfillment assessment map, comprises:
transferring, in response to optimizing profit and minimizing inventory outage thresholds being met, a first inventory of the product at a first inventory location to a second inventory of the product at a second inventory location; and
updating the geographical collection of consumers related to the second inventory location, wherein the updated geographical collection of consumers is increased based on the transferring of the first inventory to the second inventory location.

7. The method of claim 5, wherein the updating the geographical collection of consumers according to the optimizing profit and minimizing inventory outages criteria derived from adjusting the inventory availability and the inventory location using the fulfillment assessment map, comprises:
comparing the risk of inventory outages associated with order fulfillments of the product for a first inventory location to an inventory safety stock maximum threshold; and
removing, in response to the inventory safety stock maximum threshold being met, a first inventory location from the advertising campaign.

8. The method of claim 5, wherein the optimizing profit and minimizing inventory outages criteria are determined by analyzing historical cost data and inventory outage data using machine learning.

9. A computer program product comprising a computer-readable storage medium having program instructions embodied therewith, the program instructions executable by a processor to cause the processor to perform a method comprising:
identifying a consumer demography of potential consumers for an advertising campaign of a product;
receiving, through a network, inventory data associated with the product from an inventory management system;
in response to receiving the inventory data, generating an inventory node map of the product, wherein the inventory node map comprises inventory levels of one or more retail stores and one or more distribution centers of a geographic location;
analyzing the consumer demography and the inventory node map;

in response to the analyzing, identifying a geographical collection of consumers for the advertising campaign according to an inventory availability relative to the consumer demography;

receiving, through the network, fulfillment data associated with the product form a fulfillment optimization system;

in response to receiving the fulfillment data, determining relative expenses and a risk of inventory outages associated with order fulfillments of the product from the inventory node map;

generating, based on the determining, a fulfillment assessment map;

updating the geographical collection of consumers according to an optimizing profit and minimizing inventory outages criteria derived from adjusting the inventory availability and inventory location using the fulfillment assessment map; and rebalancing adverting based on the updated geographical collection of consumers.

10. The computer program product of claim 9, wherein the updating the geographical collection of consumers according to the optimizing profit and minimizing inventory outages criteria derived from adjusting the inventory availability and the inventory location using the fulfillment assessment map, comprises:

transferring, in response to optimizing profit and minimizing inventory outage thresholds being met, a first inventory of the product at a first inventory location to a second inventory of the product at a second inventory location; and updating the geographical collection of consumers related to the second inventory location, wherein the updated geographical collection of consumers is increased based on the transferring of the first inventory to the second inventory location.

11. The computer program product of claim 9, wherein the updating the geographical collection of consumers according to the optimizing profit and minimizing inventory outages criteria derived from adjusting the inventory availability and the inventory location using the fulfillment assessment map, comprises:

comparing the risk of inventory outages associated with order fulfillments of the product for a first inventory location to an inventory safety stock maximum threshold; and removing, in response to the inventory safety stock maximum threshold being met, a first inventory location from the advertising campaign.

* * * * *